US012326953B2

(12) United States Patent
Li et al.

(10) Patent No.: US 12,326,953 B2
(45) Date of Patent: Jun. 10, 2025

(54) BLOCKCHAIN-ENFORCED DATA ACCESS CONTROL

(71) Applicant: Avago Technologies International Sales Pte. Limited, Singapore (SG)

(72) Inventors: Gordon Yong Li, San Diego, CA (US); Xuemin Chen, Rancho Santa Fe, CA (US); Philippe Klein, Jerusalem (IL); Abbas Saadat, Quebec (CA); Shee-Yen Tan, Walnut, CA (US); Rui Pedro De Moura Alves Pimenta, Portishead (GB)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 178 days.

(21) Appl. No.: 17/980,475

(22) Filed: Nov. 3, 2022

(65) Prior Publication Data
US 2024/0152638 A1 May 9, 2024

(51) Int. Cl.
*G06F 21/62* (2013.01)
*G06F 16/23* (2019.01)
*G06F 21/60* (2013.01)
*H04L 9/32* (2006.01)

(52) U.S. Cl.
CPC ...... *G06F 21/6218* (2013.01); *G06F 16/2379* (2019.01); *G06F 21/602* (2013.01); *H04L 9/3247* (2013.01)

(58) Field of Classification Search
USPC ......................................................... 713/176
See application file for complete search history.

(56) References Cited

U.S. PATENT DOCUMENTS

| | | | | |
|---|---|---|---|---|
| 10,474,834 | B1* | 11/2019 | Frensch | H04L 9/3239 |
| 10,554,406 | B1* | 2/2020 | Tang | H04L 9/50 |
| 10,833,843 | B1* | 11/2020 | Vijayvergia | H04L 9/3242 |
| 10,855,475 | B1* | 12/2020 | Leach | H04L 9/0637 |
| 11,194,791 | B1* | 12/2021 | Baine | G06F 9/54 |
| 11,316,700 | B1* | 4/2022 | Michaelis | H04L 63/0428 |
| 11,379,834 | B2* | 7/2022 | Gonzales, Jr. | H04L 9/0637 |
| 11,610,012 | B1* | 3/2023 | Della Maggiora | G06F 21/645 |
| 11,855,987 | B1* | 12/2023 | Chhabra | H04L 63/12 |
| 11,921,873 | B1* | 3/2024 | McKervey | G06F 16/137 |
| 2018/0183606 | A1* | 6/2018 | High | H04L 9/3239 |
| 2018/0285839 | A1* | 10/2018 | Yang | G06Q 20/40 |

(Continued)

FOREIGN PATENT DOCUMENTS

CN 112307116 A 2/2021

OTHER PUBLICATIONS

Extended European Search Report, EP App. No. 23207498.9, Apr. 9, 2024.

*Primary Examiner* — Kambiz Zand
*Assistant Examiner* — Mahabub S Ahmed

(57) ABSTRACT

A method is provided that includes receiving a data request from a requesting device requesting data from a data source, looking up, in a blockchain ledger, a transaction corresponding to the data request to validate the data request, forwarding the validated data request to a data server, receiving a data response from the data server in response to the data request, wherein the data response comprises the requested data from the data source, and forwarding the data response to the requesting device.

20 Claims, 14 Drawing Sheets

(56) References Cited

U.S. PATENT DOCUMENTS

| | | | |
|---|---|---|---|
| 2019/0114182 A1* | 4/2019 | Chalakudi | H04L 63/0442 |
| 2019/0342078 A1* | 11/2019 | Li | H04L 67/1095 |
| 2020/0051368 A1* | 2/2020 | Pustizzi | G07F 17/329 |
| 2020/0092088 A1 | 3/2020 | Novotny et al. | |
| 2020/0097958 A1* | 3/2020 | Imoto | G06F 16/2365 |
| 2020/0119904 A1* | 4/2020 | Philyaw | H04L 63/105 |
| 2020/0169388 A1* | 5/2020 | Wei | G06Q 20/02 |
| 2020/0252410 A1* | 8/2020 | Casey | H04L 67/568 |
| 2020/0364705 A1* | 11/2020 | Yadav | H04L 9/0825 |
| 2021/0042686 A1 | 2/2021 | Ahmed et al. | |
| 2021/0176221 A1* | 6/2021 | Li | H04L 63/0457 |
| 2021/0326328 A1* | 10/2021 | Yang | G06F 16/28 |
| 2021/0334802 A1* | 10/2021 | Zhang | G06F 21/64 |
| 2022/0004667 A1* | 1/2022 | Wang | G06F 21/602 |
| 2022/0006634 A1* | 1/2022 | Ferenczi | H04L 9/50 |
| 2022/0027803 A1* | 1/2022 | Irazabal | G06Q 10/0832 |
| 2022/0029825 A1* | 1/2022 | Uhr | H04L 9/3239 |
| 2022/0045849 A1* | 2/2022 | Jing | H04L 9/088 |
| 2022/0182375 A1* | 6/2022 | Xu | H04L 63/126 |
| 2022/0182415 A1* | 6/2022 | Basu | G06F 21/6218 |
| 2022/0261491 A1* | 8/2022 | Hieronimi | G06F 21/602 |
| 2023/0037932 A1* | 2/2023 | Wen | H04L 9/3247 |
| 2023/0039746 A1* | 2/2023 | Magerkurth | H04L 9/3247 |
| 2023/0164145 A1* | 5/2023 | Baumgarte | H04L 63/10 726/4 |
| 2023/0289337 A1* | 9/2023 | Zarick | H04L 9/50 |
| 2023/0308302 A1* | 9/2023 | Hasegawa | H04L 9/3213 |
| 2023/0368296 A1* | 11/2023 | Hara | G06Q 20/389 |
| 2023/0370285 A1* | 11/2023 | Liu | H04L 9/50 |
| 2024/0056439 A1* | 2/2024 | Yan | G06F 21/645 |
| 2024/0095724 A1* | 3/2024 | Osborn | H04L 9/3247 |
| 2024/0104229 A1* | 3/2024 | Venkatesan | G06F 21/6218 |
| 2024/0205022 A1* | 6/2024 | Poschke | H04W 12/40 |
| 2024/0205216 A1* | 6/2024 | Lin | H04L 63/083 |
| 2024/0303648 A1* | 9/2024 | Davies | G06Q 20/0655 |

* cited by examiner

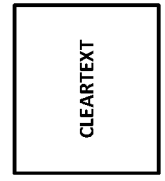
FIG. 3A
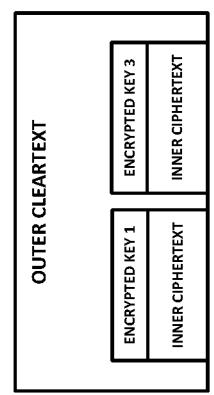
FIG. 3B
FIG. 3C
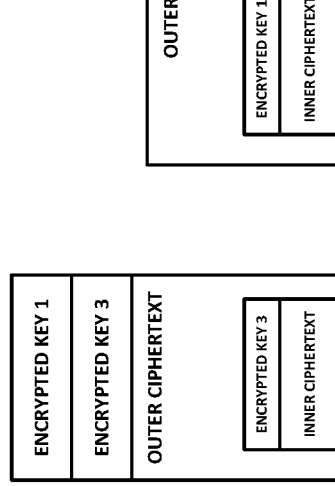
FIG. 3D
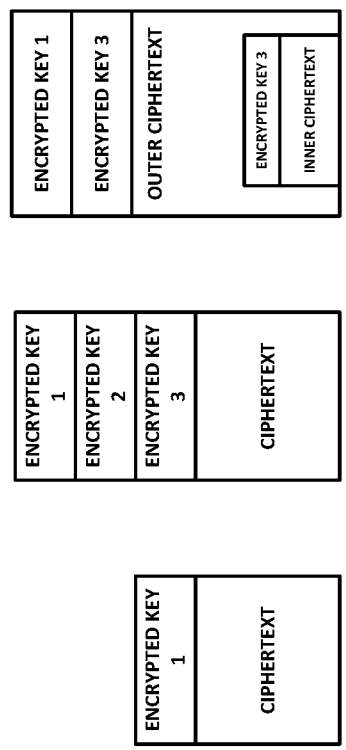
FIG. 3E

BLOCKCHAIN-ENFORCED DATA ACCESS CONTROL

TECHNICAL FIELD

The present description relates in general to network communications including, for example, data access control within a network.

BACKGROUND

Data analytics systems for video, voice, and/or data services collect and analyze a wide range of datasets from a variety of devices that make up the service networks. The datasets may include general parameters such as device performance, security status, user statistics, system health, etc. The datasets also may include data that is proprietary to service operators, original equipment manufacturers (OEMs) of the devices, and vendors of components internal to the devices such as a system on chip (SOC). The datasets also may include data that impacts the privacy of the customers or users of the services.

BRIEF DESCRIPTION OF THE DRAWINGS

Certain features of the subject technology are set forth in the appended claims. However, for purposes of explanation, several embodiments of the subject technology are set forth in the following figures.

FIGS. 3A-3E are diagrams illustrating example data encapsulating structures according to aspects of the subject technology.

DETAILED DESCRIPTION

Figure 1:
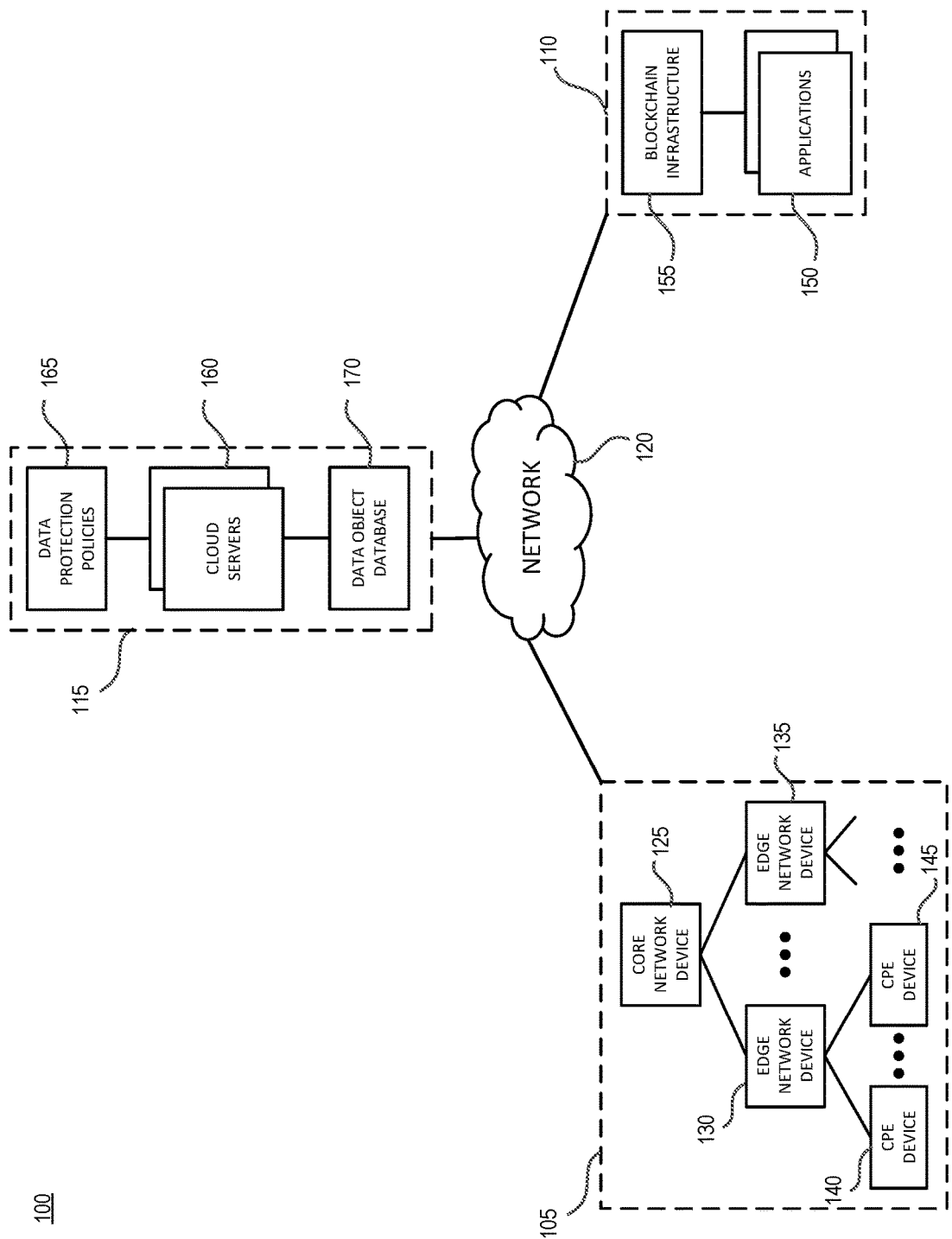
FIG. 1 illustrates an example of a network environment in which blockchain-enforced data access control may be implemented according to aspects of the subject technology.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Data analytics systems for video, voice, and/or data services collect and analyze a wide range of datasets from a variety of devices that make up service networks that provide those services. The datasets may include general parameters such as device performance, security status, user statistics, system health, etc. The datasets also may include data that is proprietary to service operators, original equipment manufacturers (OEMs) of the devices, and vendors of components internal to the devices such as a system on chip (SoC). The datasets also may include data that impacts the privacy of customers or users of the services. Secure access control for this data is essential to the operation of the service networks as well as the management and development of the devices and components that make up the service networks.

The subject technology proposes a blockchain-based enforcement system for controlling access to data generated and stored within a network. For example, a permissioned blockchain which is accessible only to members of a consortium managed by a consortium administrator (e.g., service operator) may be used to enforce data access control. Designated members of the consortium (endorsers) may be given rights by the consortium administrator to endorse data requests. The endorsement rights of these members may be based on the member's stake in the data for which access has been requested (e.g., ownership of the data, service/business agreements, etc.). Data access transactions corresponding to endorsed data requests are committed to a blockchain ledger. In some embodiments, a blockchain ledger is a digital ledger in which a series, or chain, of blocks that record transaction details, which can be subject to authentication and verification by nodes (e.g., network participants).

According to aspects of the subject technology, data requests are submitted for endorsement by the designated consortium members before the data requests are sent to a data access controller that acts as a gateway to the data-collection infrastructure that retrieves requested data from data sources in the service network. The data access controller validates the data requests against the blockchain ledger and forwards validated data requests to a data server configured to retrieve and forward the requested data to the data access controller. The data access controller then forwards the requested data to the source of the data request. Other aspects and features of the subject technology are described below.

Blockchain-enforced data access control may be used to implement a number of different applications. For example, data privacy control may be implemented by granting access rights to different types of user data only to specific applications and entities (e.g., service operators granted access rights to subscriber ID and usage data for billing systems). Proprietary data protection may be provided by restricting access rights for proprietary data to the owner of the data and any entities endorsed by the data owner. For example, access to design-sensitive SoC hardware/software parameters/metrics may be restricted to only the SoC vendor while proprietary analytic data collected from the SoC may be shared with partners of the SoC vendor. Content rights management may be provided by basing access to content data on rights endorsed by the content creator. For example, access to a machine-learning model embedded in a device may be restricted unless endorsed by the model's creator, or access to media content data (e.g., video clip) captured by a device may be restricted unless endorsed by the content creator or its licensee. Device data may be collected to verify compliance with a standard and access to the device data may be restricted to relevant entities such as service operators, standards bodies, etc. The blockchain ledgers may be maintained as secure logs for all access to data associated with or covered by a legal contract. The subject technology is not limited to these use cases and may be applied to other use cases.

FIG. 1 illustrates an example of a network environment in which blockchain-enforced data access control may be implemented according to aspects of the subject technology. Not all of the depicted components may be required, however, and one or more implementations may include additional components not shown in the figure. Variations in the arrangement, type, and number of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 1, network environment 100 includes service network 105 configured to provide video, voice, and/or data services via a network of devices, data analytics systems 110 configured to obtain data from service network 105 for processing and analysis, and data manager 115 configured to facilitate the transfer of data between service network 105 and data analytics systems 110. Service network 105, data analytics systems 110, and data manager 115 may be communicably coupled via network 120. Network 120 may be a public communication network (such as the Internet) or a private communications network (such as private local area network (LAN) or leased lines). Network 120 also may include, but is not limited to, any one or more of the following network topologies, including a bus network, a star network, a ring network, a mesh network, a star-bus network, a tree or hierarchical network, and the like.

As noted above, service network 105 may be configured to provide video, voice, and/or data services via a network of devices. According to aspects of the subject technology, the devices may be arranged in a hierarchical topology and may include core network device 125, edge network devices 130 and 135, and consumer-premises equipment (CPE) devices 140 and 145. The subject technology is not limited to any particular number of devices in a given layer of the hierarchical topology or any particular number of layers. Core network device 125 may represent a root device in a Data Over Cable Service Interface Specification (DOC SIS) broadband access network, a digital television network, and/or an Internet Protocol (IP) telephony network. Edge network devices 130 and 135 may represent devices configured to form constituent edge networks of the core network with devices such as a cable modem termination system (CMTS), cable remote PHY devices (RPD), cable remote MAC/PHY devices (RMD), etc. CPE devices 140 and 145 may represent nodes of the edge networks including, but not limited to, cable modems, residential gateways, IP set-top boxes, etc. One or more of the devices forming service network 105 may be implemented using SoCs embedded in the devices. SoCs may integrate a processor such as a central processing unit (CPU), memory interfaces, secondary storage interfaces, input/output devices, input/output interfaces, etc. into a single integrated circuit or chip.

Figure 2:
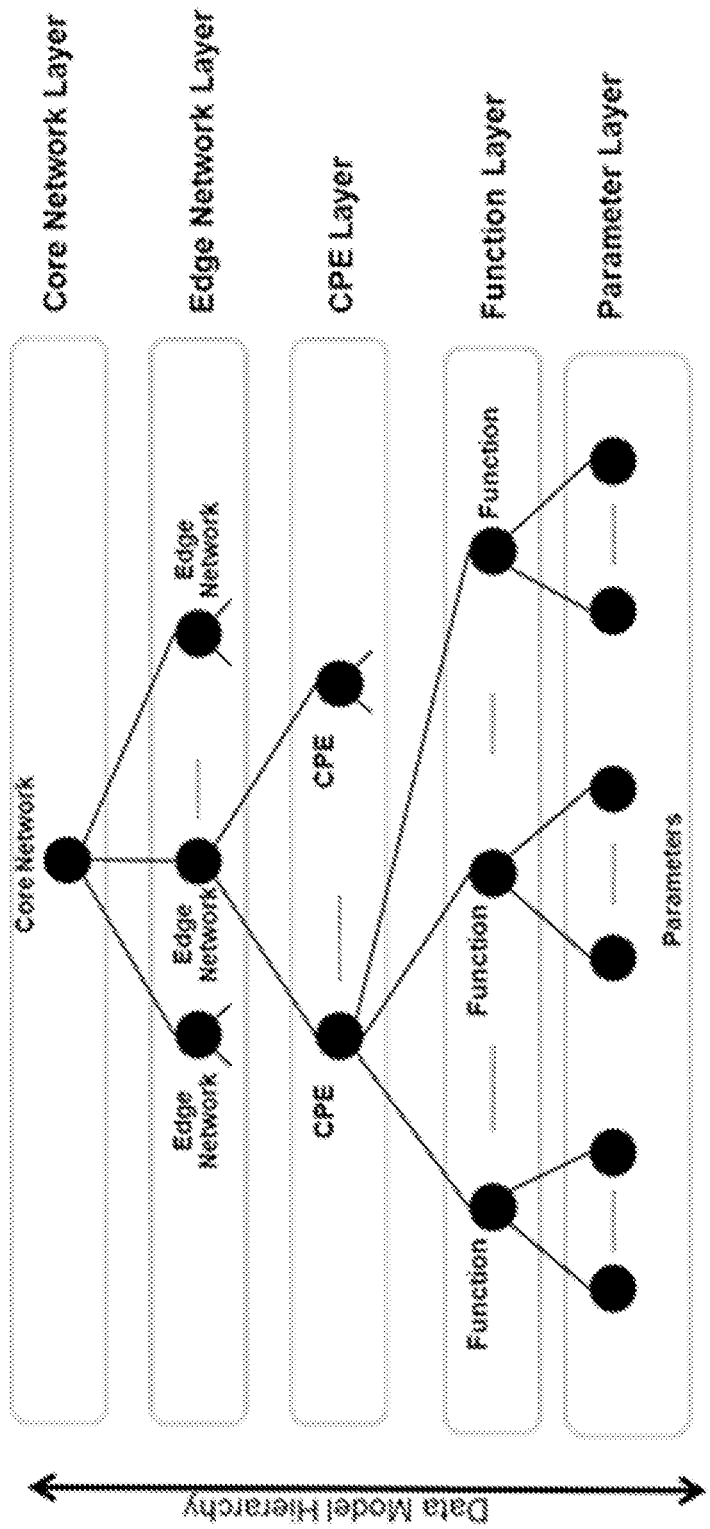
FIG. 2 is a diagram illustrating an example hierarchical data model according to aspects of the subject technology.

The data associated with the devices of service network 105 may be organized into a hierarchical tree-structure data model. FIG. 2 is a diagram illustrating an example hierarchical data model according to aspects of the subject technology. As depicted in FIG. 2, nodes of the data model (represented by the dots) are organized into aggregation layers that generally correspond with the layers of the network topology. Each of the nodes of the data model may represent either a single data parameter, such as those nodes aggregated in the parameter layer, or may represent a group of parameters associated with the core network in the core network layer, constituent edge networks in the edge network layer, CPEs within an edge network in the CPE layer, or a functional area of a CPE in the function layer. Functional areas of a CPE may include audio/video, Wi-Fi, cable PHY, etc. A parameter in the parameter layer may include, for example, a video decoder buffer status from a group of video decoder parameters.

Different nodes within the hierarchical data model may have different security requirements. For example, node data associated with one type of CPE device in the CPE layer may require confidentiality and data integrity protection. Node data associated with another type of CPE device in the CPE layer may require only data integrity protection. Node data associated with any other type of CPE device in the CPE layer may have no protection requirements. Similar requirement differentiation between nodes may exist on other layers such as the edge network layer, the function layer, and/or the parameter layer.

Security requirements for node data in one layer of the hierarchical data model may set minimum security requirements for node data in layers below that layer in the hierarchical data model. The minimum-security requirements may apply to all node data aggregated in the lower layers of the hierarchical data model. When there is requirement differentiation between nodes within one of the layers, for example, the minimum-security requirements specified for the node data of one upper layer node may apply only to nodes in the lower layers that are part of a sub-tree rooted at the upper layer node.

Returning to FIG. 1, data analytics system 110 may include one or more applications 150 configured to request data from service network 105 and to process/analyze the data received from service network 105 according to aspects of the subject technology. Applications 150 may include one or more sequences of instructions stored and executed by one or more processors on a server or some other type of computing device to request data and process/analyze the returned data. Applications 150 may be associated with one or more members of a consortium that may have a proprietary interest in or have been granted access to certain types of data and/or certain data sources (e.g., nodes) in service network 105.

According to aspects of the subject technology, data access control for applications 150 may be provided in part by blockchain infrastructure 155. Briefly, blockchain infrastructure 155 includes blockchain components configured to endorse data requests from applications 150 based on an access control list, order transactions corresponding to endorsed data requests into blocks, commit the blocks to blockchain ledgers, and validate data requests based on transactions recorded in the blockchain ledgers. The terms "validate" or "validation" may refer to an accuracy and quality check of data prior to using and/or processing the data. In this regard, validation may include checking data for data type, range, code and cross reference, and/or consistency. The components and operations of the blockchain infrastructure are described in more detail below.

As depicted in FIG. 1, data manager 115 includes one or more cloud servers 160, data protection policies 165, and data object database 170 according to aspects of the subject technology. Cloud servers 160 may include a membership service provider configured to manage the formation and governance of a blockchain consortium for implementing a blockchain-enforced data access control for applications accessing data in a service network, such as service network 105. The membership service provider may be owned and operated by a consortium administrator (e.g., service operator) who may stipulate a consortium governance charter that is agreed to and digitally signed by the consortium members. The digital signatures of the consortium members may be included in a genesis block of the blockchain ledger. The consortium governance charter may include endorsement and enforcement rules and conditions for data access control, blockchain ledger structure and maintenance procedures, scope of data access in terms of SoC/device types, product IDs, etc., and a validity period of the charter.

The membership service provider may issue cryptography credentials (e.g., public/private encryption keys) from a certificate authority to consortium members and functional nodes. As part of initialization, all constituent devices such as those that host consortium functional elements are enrolled into the consortium before becoming operational. The enrollment message records for the constituent devices may be included in the blockchain ledger for the consortium. The enrollment messages may record the origination device (e.g., CPE device), the end device (e.g., cloud servers 160), and intermediate devices (e.g., edge network device, core network device) along an enrollment path between the origination device and the end device. The intermediate devices along the enrollment path may be identified and tagged using their respective digital signatures, which attest that the intermediate devices support and permit the enrollment in the consortium.

According to aspects of the subject technology, cloud servers 160 also may include a data server configured to collect data from data clients such as nodes of service network 105 based on endorsed data requests made by applications 150. For example, the data server may be configured to forward an endorsed data request to a data source (e.g., a device in service network 105) identified in the data request and receive a data response from the data source including the requested data (e.g., node data from the hierarchical data model) identified in the data request. In addition, the data server may host data object database 170, which may be used to store historical datasets collected from data clients and datasets that may be periodically pushed to the data server by one or more data clients based on their respective configurations.

As mentioned above, data nodes in the hierarchical data model representing service network 105 may have security requirements. According to aspects of the subject technology, security requirements for the data or data objects of a data node may be met using secure encapsulation of the data or data objects. For example, a data source responding to a data request may encapsulate the data or data objects included in the data response according to the security requirements of the data node.

Secure encapsulation adds an encapsulation header to the data response. The encapsulation header may include a number of fields populated with information regarding the data or data objects and the associated security requirements. For example, the encapsulation header may have fields populated with attributes of the data node, attributes of a security suite or protection scheme used to secure the requested data in the data response, and identifiers of one or more destination devices (e.g., server running application that requested the data) to which the data response is being directed. The attributes of the data node may include, but are not limited to, an identifier of the data node, a location of the data node, a data category of the node data (e.g., user privacy data, proprietary data, etc.), and a type of protection being applied to the requested data in the data response. Types of protection may include, but are not limited to, encryption only, signature only, encryption and signature, anonymized, anonymized and signature, and no protection.

Attributes of the security suite or protection scheme may include, but are not limited to, an identifier of the security algorithm and parameters of the security algorithm used to secure the requested data. The security algorithm may include any type of cryptographic operation, including any encryption algorithm or hash algorithm. The secure encapsulation of the data response also may include a field that contains a protected version of the data node. If the security algorithm used to secure the requested data is an encryption algorithm, the protected version of the data node is cipher text generated using the encryption algorithm and associated parameters identified in the encapsulation header. If the security algorithm used to secure the requested data is a hash algorithm, the protected version of the data node is the hash result obtained using the hash algorithm identified in the encapsulation header. If the security algorithm used to secure the requested data includes a digital signature, the secure encapsulation of the data response may include a field containing a digital signature, or some authentication message, covering the encapsulation header and the protected data node and generated according to the security algorithm and associated parameters identified in the encapsulation header.

According to aspects of the subject technology, the encapsulation header fields allow data privacy to be supported. In particular, the encapsulation header fields can be used to signal to destination devices about the data privacy mechanism and the associated parameters. The data category field may indicate the data category of the encapsulated data is "user privacy data", "proprietary data", etc. for example. The protection type field may indicate the user privacy policy applied to the protected data. For instance, the policy can indicate "anonymization-hash" for data anonymization via data hashing, "anonymization-tag" for data anonymization via data tagging. Furthermore, the policy can indicate that differential privacy (DP), tokenization, k-Anonymization, or cryptosystems which can use its homomorphic properties (for example Homomorphic Encryption (HE) and Functional Encryption (FE)) is applied to the protected data. The security suite attributes identify Security Algorithms and Parameters of Security Algorithms for the required Protection Type. For instance, these attributes can indicate the specific anonymization treatment scheme and any associated input parameters. For the HE and FE protection mechanisms, the Security Algorithms can indicate the specific HE or FE algorithm such as BGV (Brakerski-Gentry-Vaikuntanathan), BFV (Brakerski-Fan-Vercauteren), CKKS (Cheon-Kim-Kim-Song) and entropy/security level. Additionally, the Parameters of Security Algorithms can indicate any necessary crypto materials for these algorithms, such as the public key for a HE algorithm.

The same node data may be requested and provided to multiple destination devices, which are identified in the encapsulation header. According to aspects of the subject technology, the node data may be encrypted with respective content-encryption keys (CEK) associated with the multiple destination devices. To protect the respective content-encryption keys, respective key encryption keys (KEK) associated with the multiple destination devices may be used to encrypt the corresponding content-encryption keys, which may be included in the data response sent to the multiple destination devices.

FIGS. 3A-3E are diagrams illustrating example encapsulated data structures according to aspects of the subject technology. For these figures, encrypted content-encryption keys for three different destination devices for the encapsulated data are labeled ENCRYPTED KEY 1, ENCRYPTED KEY 2, and ENCRYPTED KEY 3. The subject technology is not limited to three destination devices and may provide the encapsulated data to any number of destinations devices. In the example shown in FIG. 3A, the ciphertext of the node data is distributed with a CEK encrypted with the KEK of a first destination device and therefore only that first destination device is able to decrypt the ciphertext. With respect to FIG. 3B, the ciphertext of the node data is distributed with CEKs encrypted with respective KEKs associated with three respective destination devices, and therefore all three of the destination devices are able to decrypt the ciphertext.

According to aspects of the subject technology, security requirements for a data node may be imposed on data sub-nodes that are part of a data model sub-tree that is rooted at the data node. In addition, the data sub-nodes may have their own security requirements. Referring to FIG. 3C, both a first destination device and a third destination device can decrypt the ciphertext of the overall node data. However, only the third destination device can decrypt the ciphertext of an inner node or sub-node. In FIG. 3D, the overall node data is unprotected, but there are two different sub-nodes and the ciphertext of one the two sub-nodes can be decrypted by the first destination device and the ciphertext of the other sub-node can be decrypted by the third destination device. Finally, FIG. 3E depicts node data with no protection scheme that is distributed as cleartext.

Figure 4:
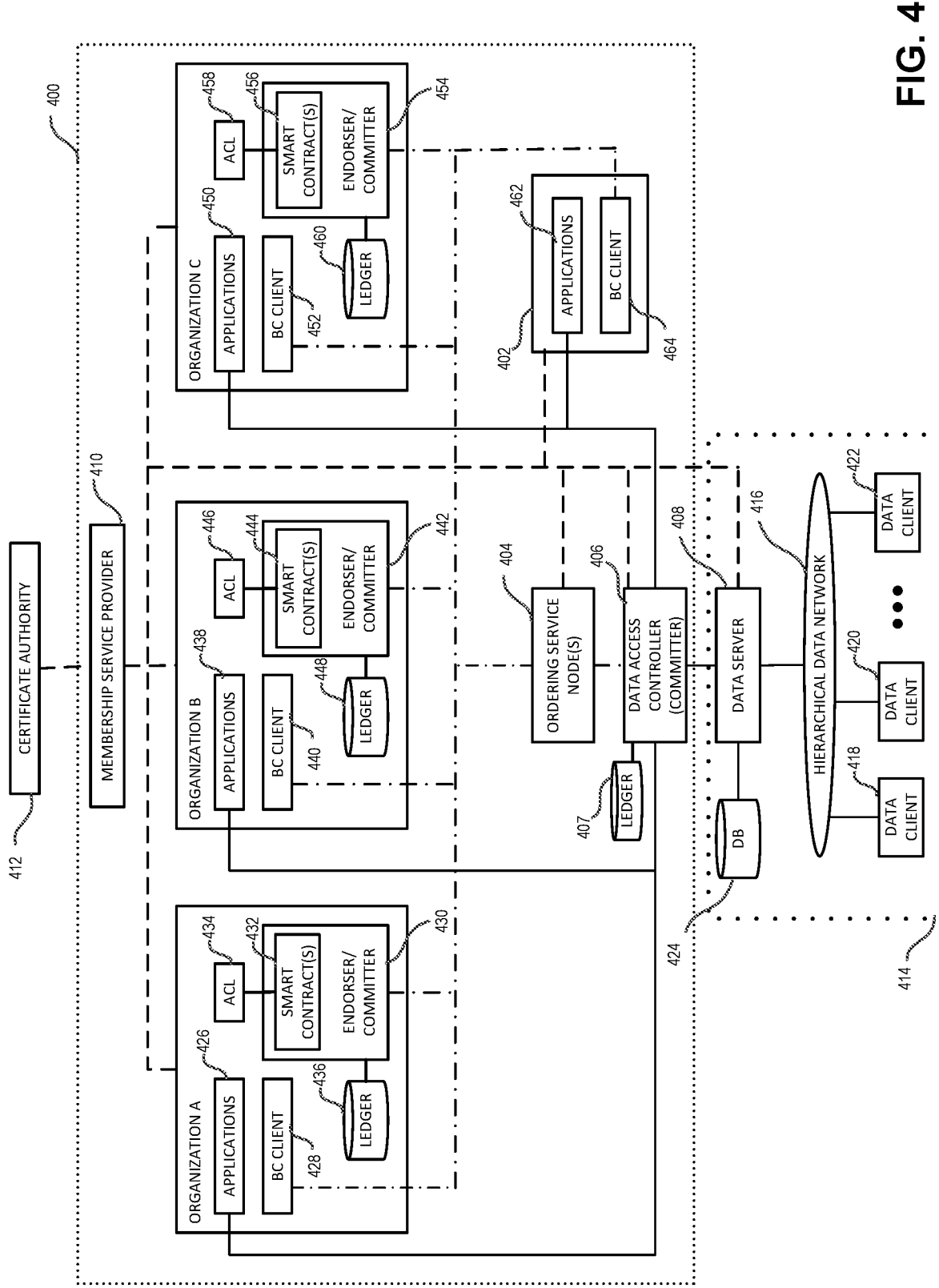
FIG. 4 is a block diagram illustrating functional components of a blockchain consortium scheme according to aspects of the subject technology.

FIG. 4 is a block diagram illustrating components of a blockchain consortium scheme according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 4, blockchain consortium 400 includes consortium members Organization A, Organization B, Organization C, and application developer 402. Blockchain consortium 400 also includes membership service provider 410, ordering service node(s) 404, and data access controller 406. As previously discussed, membership service provider 410 may be configured to establish blockchain consortiums, such as blockchain consortium 400, and manage the membership thereof. Membership service provider 410 also may be configured together with certificate authority 412 to manage security credentials (e.g., identities, public/private keys, etc.) assigned to and used by consortium members and functional nodes within the blockchain consortium.

Also depicted in FIG. 4 is data collection infrastructure 414 that includes data server 408 and hierarchical data network 416 with data clients 418, 420, and 422. Hierarchical data network 416 may be a service network configured to provide voice, digital television, and/or broadband data services. Data clients 418, 420, and 422 represent devices in hierarchical data network 416 such as core network devices, edge network devices, CPE devices, SoC devices, etc. Data server 408 may be configured to retrieve data from one or more devices in hierarchical data network 416 in response to a data request received by data server 408, and provide the retrieved data to a source of the data request. Data collection infrastructure 414 further includes data object database 424, which may be used and maintained by data server 408 to store data sets retrieved from hierarchical data network 416 as well as data sets that may be pushed to data server 408 by one or more data clients periodically and/or based on monitored conditions for example.

With respect to Organization A in blockchain consortium 400, the entity includes one or more applications 426, blockchain client 428, blockchain endorser/committer 430, one or more smart contracts 432, access control list (ACL) 434, and local copy blockchain ledger 436. One or more of applications 426 may be an analytical application configured to request data from one or more data clients in hierarchical data network 416 to process and analyze the requested data. Blockchain client 428 may be configured to act as an interface for applications 426 to submit data requests for endorsement by blockchain endorsers such as blockchain endorser/committer 430. The endorsement logic may be embedded in one or more smart contracts 432 that is configured to check the data request against provisioned access control list (ACL) 434 and endorse the data request if authorized according to ACL 434.

Ordering service node(s) 404 is a functional blockchain component configured to validate endorsed data requests and execute a consensus algorithm (e.g., Crash Fault Tolerance, Byzantine Fault Tolerance, etc.) to order data transactions corresponding to the endorsed data requests into blocks. Blockchain endorser/committer 430 may be further configured to validate ordered blocks of transactions received from ordering service node(s) 404 and commit the validated blocks of transactions to local copy of blockchain ledger 436.

Data access controller 406 is a functional blockchain component configured to operate as a gateway between blockchain consortium 400 and data collection infrastructure 414. In particular, data access controller 406 may be configured to verify or validate data requests from applications 426 against blocks of data transactions committed to local copy of blockchain ledger 407 and forward validated data requests to data server 408 to request the data from hierarchical data network 416 and provide the data response with the requested data to applications 426.

As depicted in FIG. 4, organization B includes the same components as organization A. Namely, organization B includes one or more applications 438, blockchain client 440, blockchain endorser/committer 442, one or more smart contracts 444, access control list (ACL) 446, and local copy blockchain ledger 448. Similarly, organization C also includes the same components as with organizations A and B. Namely, organization C includes one or more applications 450, blockchain client 452, blockchain endorser/committer 454, one or more smart contracts 456, access control list (ACL) 458, and local copy blockchain ledger 460. The operations of the components in organizations B and C are the same as those in organization A and will not be repeated here.

As depicted in FIG. 4, application developer 402 includes one or more applications 462 and blockchain client 464. The operations of one or more applications 462 and blockchain client 464 are nearly the same as the commonly named components in organizations A, B, and C. The main variation in the operations of these components is that application developer 402 does not include a blockchain endorser/committer and therefore application developer 402 does not provide its own endorsement of data requests from one or more applications 462. Blockchain client 464, as well as blockchain clients 428, 440, and 452, may provide data requests to all three blockchain endorser/committers for review and endorsement.

According to aspects of the subject technology, the various components depicted in FIG. 4 may be implemented individually in respective servers. Alternatively, combinations of components may be implemented on respective servers. For example, the components associated with organization A may be implemented together on a single server or group of servers. The servers may be physically located near the owning entities. Alternatively, one or more servers may be implemented as cloud servers. The subject technology is not limited to any particular arrangement or type of servers.

Figure 5:
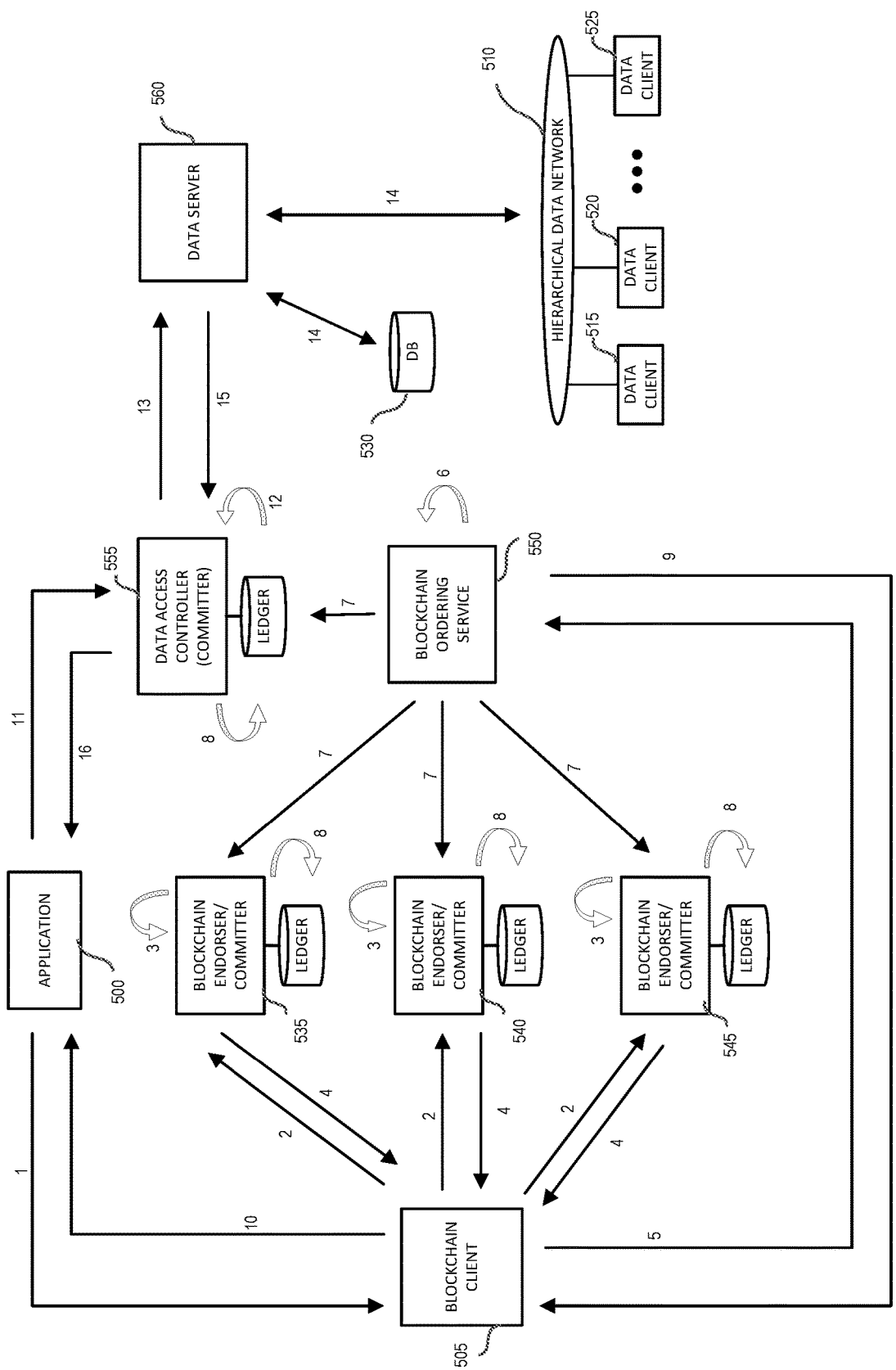
FIG. 5 is a block diagram illustrating a blockchain-enforced data access control workflow according to aspects of the subject technology.

FIG. 5 is a block diagram illustrating a blockchain-enforced data access control workflow according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise. The blockchain-enforced data access control workflow is not limited to the processes and operations indicated in FIG. 5 and may be implemented with one or more intervening processes or operations and/or one or more alternative processes or operations.

According to aspects of the subject technology, a workflow for blockchain-enforced data access control may include a first phase for endorsing a request to access data and a second phase for controlling the access to the data. Referring to FIG. 5, the first phase includes (1) application 500 notifying blockchain client 505 of a data request to access data from a data source within hierarchical data network 510 (e.g., one of data clients 515, 520, 525, or a data set stored in database 530). (2) Blockchain client 505 proposes the data request to blockchain endorsers/committers 535, 540, and 545 in the consortium. (3) Blockchain endorsers/committers 535, 540, and 545 evaluate the proposed data request using an access control list (ACL), which includes minimum security requirements for the different nodes in the hierarchical data model, for example. (4) After determining that the proposed data request is in compliance with security requirements specified in the ACL, blockchain endorsers/committers 535, 540, and 545 respond to blockchain client 505 with their respective endorsements. (5) After receiving the endorsements, blockchain client 505 sends the proposed data request to blockchain ordering service. (6) Blockchain ordering service 550 performs a consensus operation to order data transactions, including the proposed data request, into an ordered transaction block and (7) broadcasts the ordered transaction block to blockchain committers in the consortium (e.g., blockchain endorsers/committers 535, 540, 545, and 555). (8) The blockchain committers in the consortium validate the ordered transaction block and commit it to respective local blockchain ledgers. (9) Blockchain ordering service 550 notifies blockchain client 505 that the ordered transaction block containing the proposed data request has been generated and broadcast to the blockchain committers. (10) Blockchain client 505 notifies application 500 of the endorsement of the proposed data request to complete the first phase of the access control process.

According to aspects of the subject technology, the second phase for blockchain-enforced access control begins when (11) application 500 sends the data request to data access controller 555. (12) Data access controller 555 validates the data request against the local blockchain ledger to confirm the endorsements by the blockchain endorses in the consortium by looking up the transaction corresponding to the data request in the local blockchain ledger. (13) After validating the data request, data access controller 555 forwards the validated data request to data server 560. (14) Data server 560 initiates data collection either from database 530 for historical data or from data clients in hierarchical data network 510 for on-demand requests. (15) Data server 560 returns the requested data collected from database 530 and/or one of data clients 515, 520, or 525 in a data response to data access controller 555. (16) Data access controller 555 forwards the data response to application 500 to complete the second phase for blockchain-enforced access control.

Figure 6:
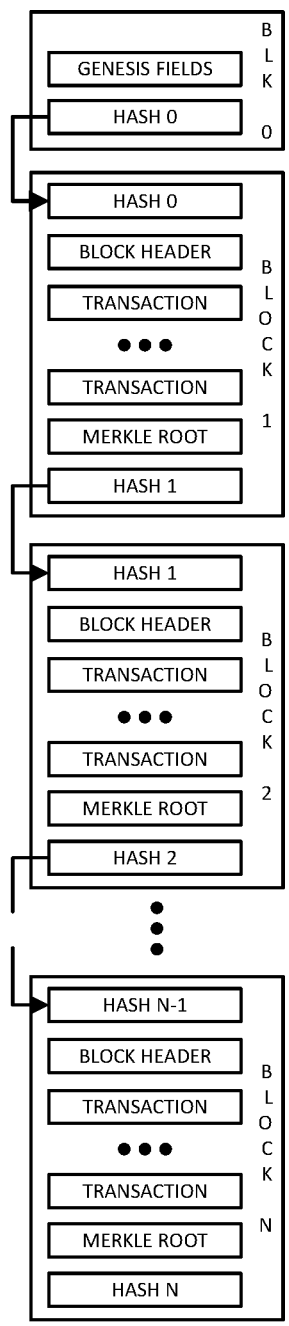
FIG. 6 is a diagram illustrating elements of a blockchain ledger according to aspects of the subject technology.

FIG. 6 is a diagram illustrating elements of a blockchain ledger according to aspects of the subject technology. As depicted in FIG. 6, the blockchain ledger includes a series of blocks (e.g., block 0, block 1, block 2, . . . block n) that, with exception of the first block in the blockchain (block 0), are linked by including a hash of the respective preceding block in the blockchain in each block. For example, block 1 includes the hash of block 0, block 2 includes the hash of block 1, etc. The subject technology is not limited to any particular hash algorithm and may be implemented using one of SHA-256, SHA-512, SHA-31, Shake, etc. In addition to the hash of the preceding block in the blockchain, the blocks may include a list of transactions and the Merkle root of the transactions that may be used for data integrity validation and verification. In addition, Merkle trees provide a highly efficient proof of inclusion (POI) that may be used to prove the existence of a particular transaction in the blockchain ledger for monitoring and/or querying purposes.

The genesis or originating block in the blockchain ledger (block 0) may be created by the ordering service in the blockchain infrastructure and include a number of genesis fields. For example, the genesis fields may include an identifier and a creation timestamp for the blockchain. The genesis fields also may identify the administrator and other original members of the blockchain consortium and include their respective digital certificates. The genesis fields may include an indication of a type of blockchain (e.g., data access control, cyber security, inventory/asset management, digital rights management). The genesis fields may further include the blockchain consortium governance contract that includes information such as consensus protocol, signatures of consortium governance contract by participants, hash algorithm, signature or message authentication algorithms and associated parameters, and messaging channels.

The blocks following the genesis block may include a block header containing information specific to the respective block. For example, the block header may include a block identifier, a creation timestamp, an ordering service identifier, attributes related to the consensus protocol (e.g., Crash Fault Tolerant (CFT) consensus algorithms such as Raft), and a signature of the ordering service node.

Each transaction listed in the blocks includes a set of information providing details about the transaction. For example, the information may include the transaction originator identifier, a timestamp of the request, and attributes of a target SoC such as vendor, type, identifier, and capabilities. The information may further include details about the blockchain endorsers such as local memory, CPU, and buffering capacities, as well as the statuses of the blockchain endorsers. The information may further include details about the data request used to determine whether to endorse the data request or not. Finally, the information may include the signature of the transaction originator.

Figure 7:
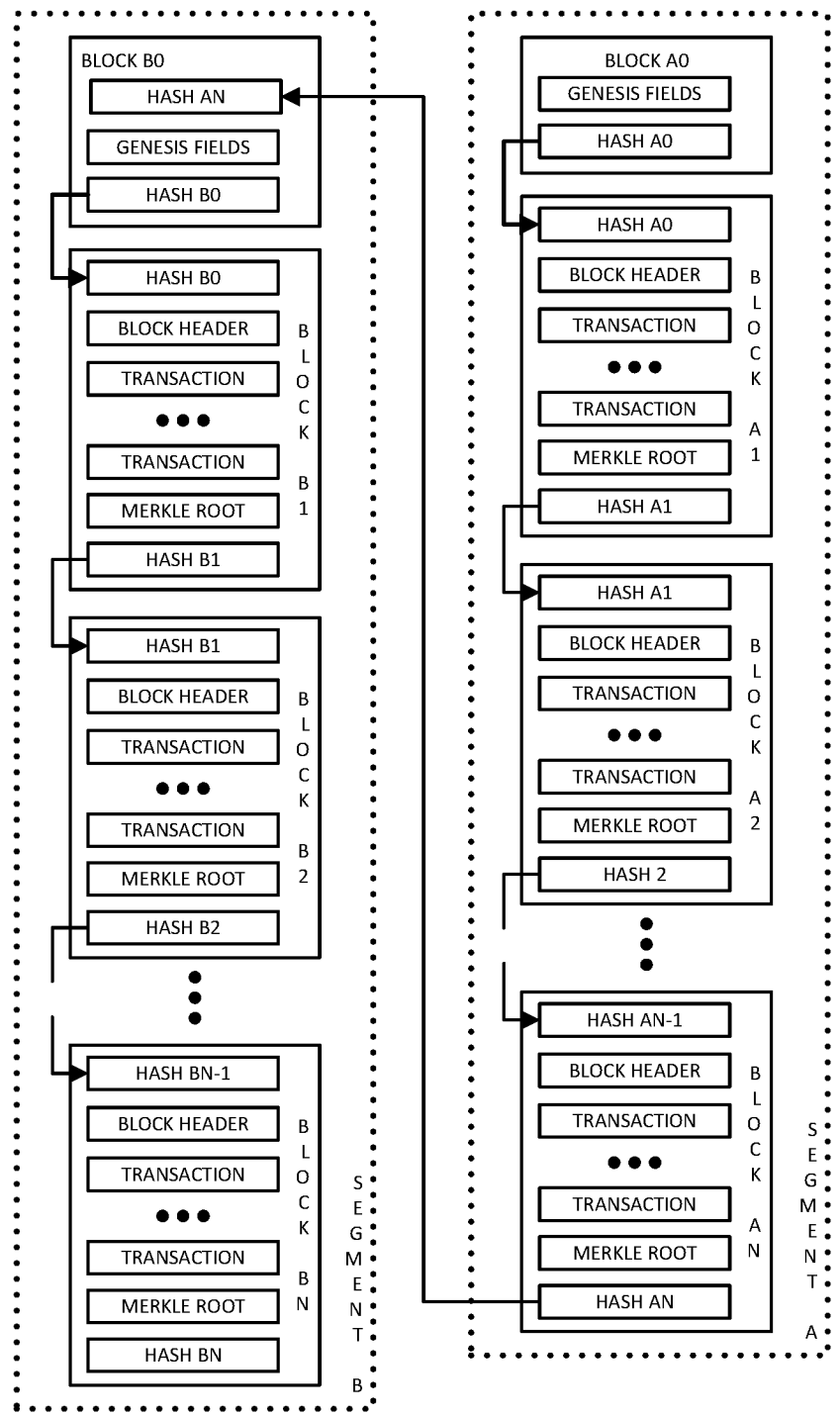
FIG. 7 is a diagram illustrating the segmentation of a blockchain ledger according to aspects of the subject technology.

The blockchain may be segmented regularly (e.g., monthly) or when certain conditions have been met (e.g., blockchain endorser memory and/or CPU usage threshold exceeded). The decision to segment the blockchain may be made by the ordering service nodes based on blockchain archival rules. When a blockchain is segmented, a new active segment is created and the previous segment is archived. FIG. 7 is a diagram illustrating the segmentation of a blockchain ledger according to aspects of the subject technology. With reference to FIG. 7, segment A of the blockchain ledger is the archived segment and segment B is the currently active segment. Similar to the blocks within each segment, the segments are linked via the hashes of the last blocks of the previously active segments which is illustrated in FIG. 7 with hash AN being included in block B0 of the active segment. The Edison fields may include a blockchain segmentation index which may be used to help manage growth of the blockchain and/or memory/storage.

Figure 8:
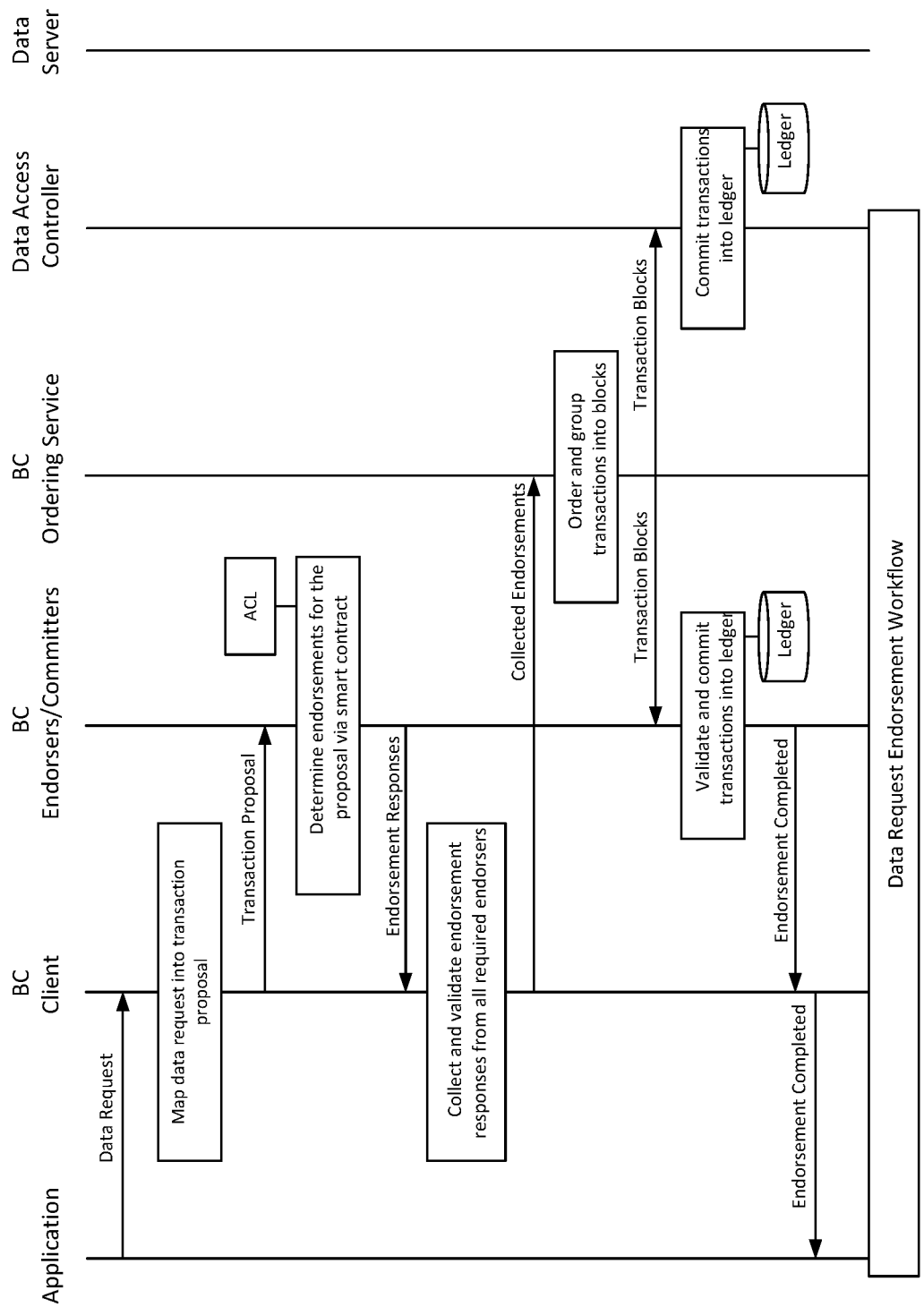
FIG. 8 is a diagram illustrating a workflow for endorsing a data request made by an application according to aspects of the subject technology.

FIG. 8 is a diagram illustrating a workflow for endorsing a data request made by an application according to aspects of the subject technology. According to aspects of the subject technology, the workflow may begin upon an application generating a data request and forwarding the data request to a blockchain client for endorsement. The blockchain client may forward the data request to one or more blockchain endorsers/committers for endorsement. Alternatively, the blockchain client may map the data request into a data transaction proposal and forward the transaction proposal to the one or more blockchain endorsers/committers for endorsement.

The blockchain endorsers/committers determine endorsements for the data request or transaction proposal via a smart contract that includes logic to check the data request or transaction proposal against a provisioned access control list (ACL), or some other form of data access control policy, and endorse the data request or transaction proposal if authorized according to the ACL. The blockchain endorsers/committers return their respective endorsement responses to the blockchain client, which collects and validates the received endorsement responses. The blockchain client forwards the collected endorsements to a blockchain ordering service which is configured to order and group data transactions into blocks. The blocks of transactions are provided to the blockchain endorsers/committers to be validated and committed into local copies of the blockchain ledger. In addition, the blocks of transactions are provided to a data access controller, which commits the blocks of transactions into a local copy of the blockchain ledger. The blockchain endorsers/committers may inform the blockchain client that the endorsement and commitment of the blocks of transactions to the blockchain ledger are complete. The blockchain client may then in turn inform the application that the endorsement process is complete.

Figure 9:
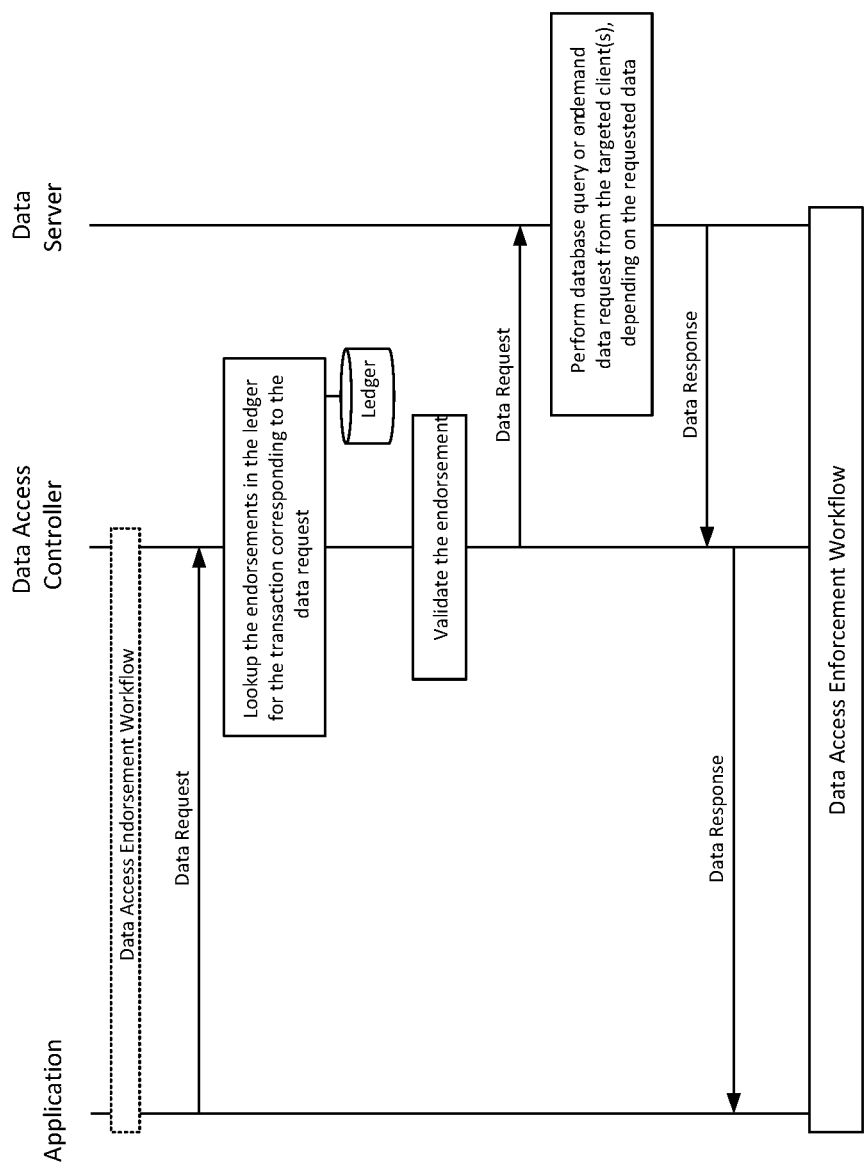
FIG. 9 is a diagram illustrating a workflow for using a blockchain-enforced data access control according to aspects of the subject technology.

FIG. 9 is a diagram illustrating a workflow for using a blockchain-enforced data access control according to aspects of the subject technology. According to aspects of the subject technology, the workflow may begin after the application has been informed that the endorsement process is complete and the transaction block has been committed to the blockchain ledger. In turn, the application forwards the data request to the data access controller which validates the data request by looking up the endorsements in the blockchain ledger. Once validated, the data request may be forwarded to the data server which either performs a database query in a dataset database or submits an on-demand data request directly to the data source for the requested data. The data server receives a data response including the requested data from the data source and forwards the data response to the application.

The examples above primarily reference implementations involving a single blockchain consortium. However, the subject technology is not limited implementations involving only a single blockchain consortium and may be implemented in environments where two or more blockchain consortiums are formed and used. For example, blockchain consortiums may be formed between a service operator and an SoC vendor; among a service operator and multiple SoCs and device vendors; among multiple service operators; among a SoC vendor and multiple device vendors. FIG. 9 is a block diagram illustrating functional components of a blockchain consortium scheme according to aspects of the subject technology.

Figure 10:
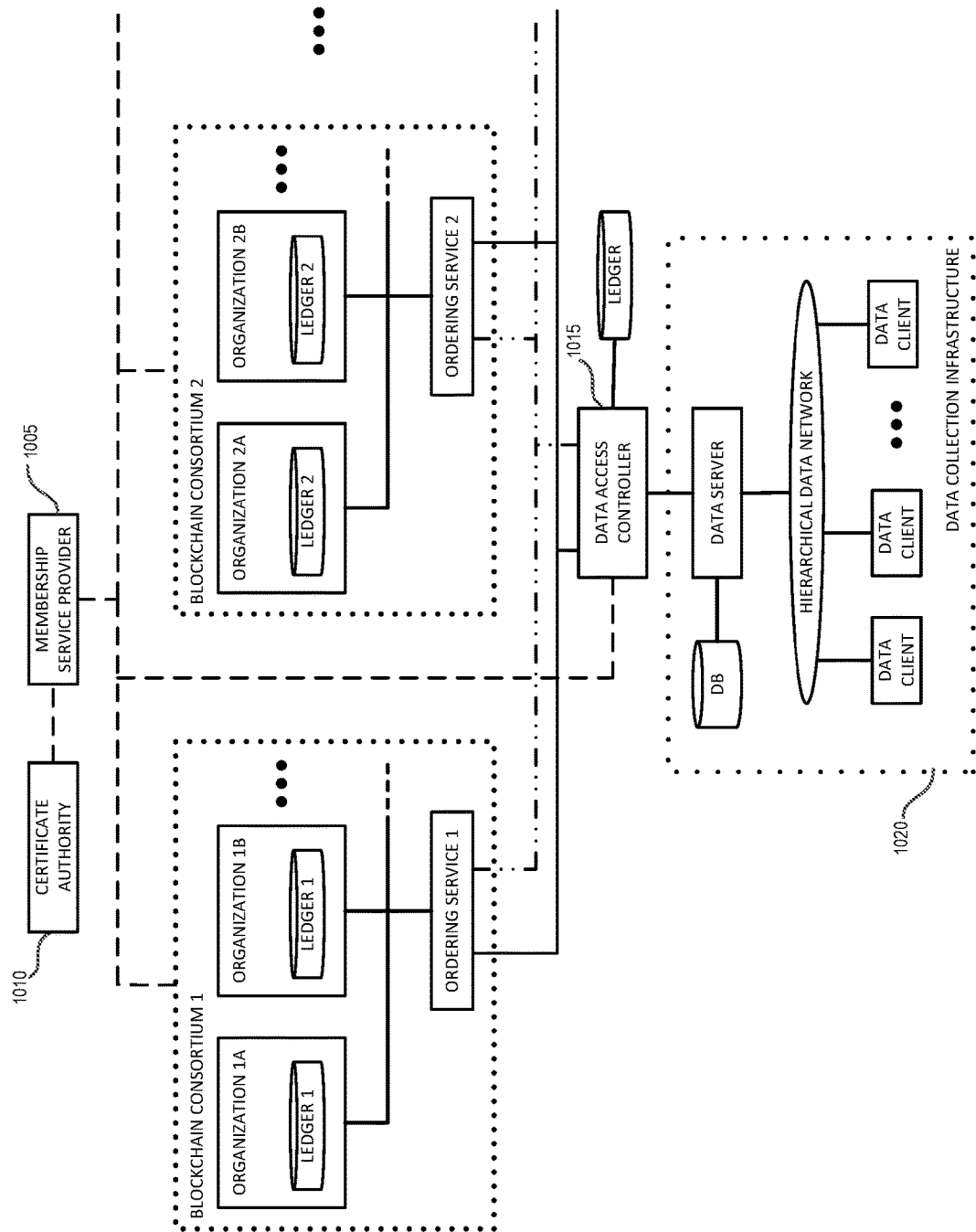
FIG. 10 is a block diagram illustrating components of a blockchain consortium scheme according to aspects of the subject technology.

FIG. 10 is a block diagram illustrating components of a blockchain consortium scheme according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 10, the blockchain consortium scheme includes two blockchain consortiums, blockchain consortium 1 and blockchain consortium 2, and each of the blockchain consortiums is depicted with two organizations organization 1A and organization 1B for blockchain consortium 1, and organization 2A and organization 2B for blockchain consortium 2. It is noted that the subject technology is not limited to two blockchain consortiums, nor to two organizations per blockchain consortium, and may be implemented with more than two of either or both of these components.

In the example depicted in FIG. 10, blockchain consortium 1 and blockchain consortium 2 utilize their own respective blockchain ledgers (ledger 1 and ledger 2). However, blockchain consortium 1 and blockchain consortium 2 may share membership service provider 1005 and certificate authority 1010 to form and manage their respective blockchain consortiums. In addition, both blockchain consortiums may utilize data access controller 1015 to request and collect data from data collection infrastructure 1020. However, the subject technology is not limited to this arrangement and may be implemented with each blockchain consortium having and using their own respective membership service provider, certificate authority, and data access controller.

Figure 11:
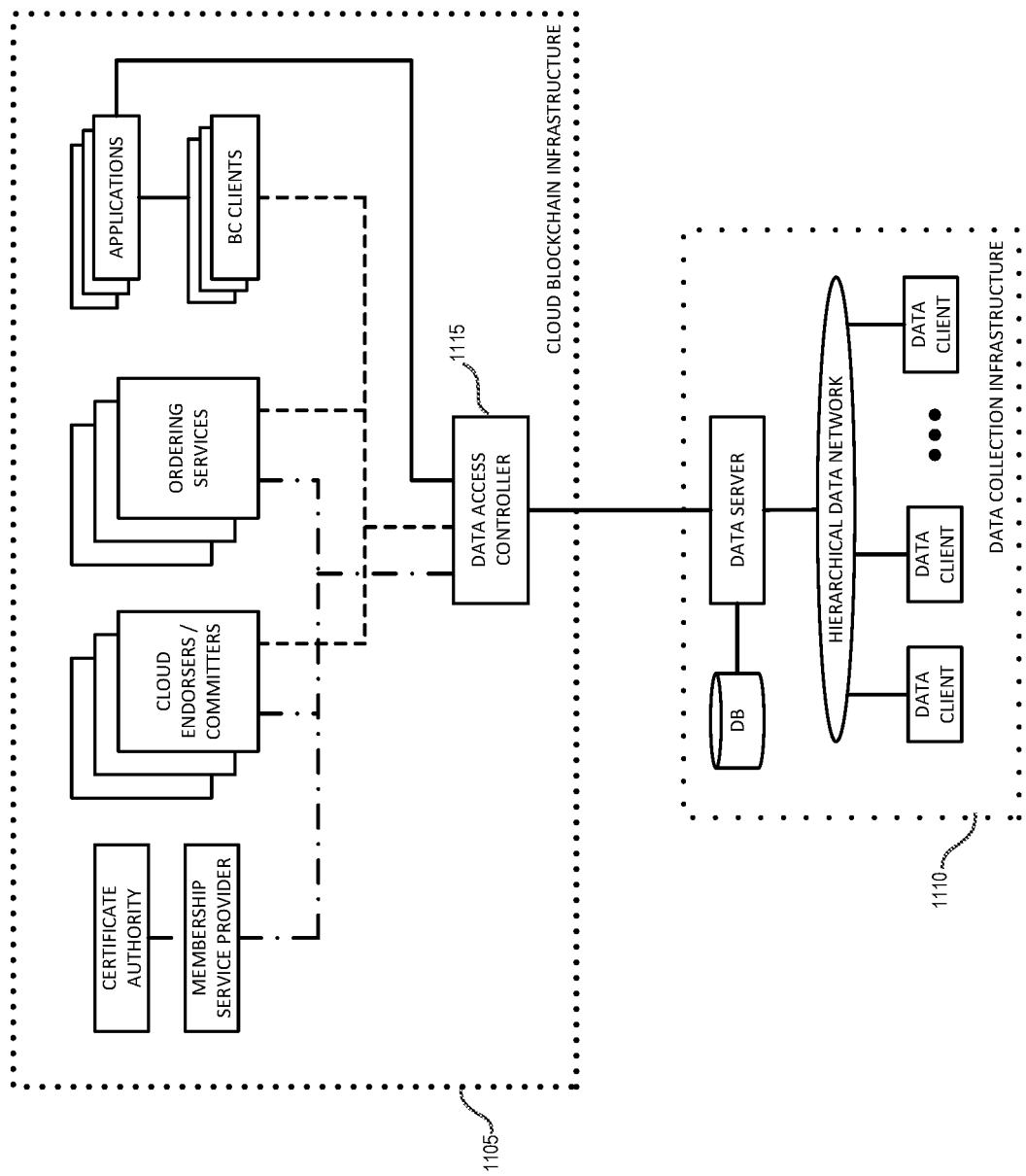
FIG. 11 is a block diagram illustrating components of a blockchain consortium scheme according to aspects of the subject technology.

FIG. 11 is a block diagram illustrating components of a blockchain consortium scheme according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

In the example depicted in FIG. 11, data access controller 1115 and the blockchain elements 1105 (e.g., membership service provider, endorsers/committers, ordering services (order service nodes), applications, blockchain clients) are centralized in the cloud. Examples of the operations of these elements are provided above and will not be repeated here. Data access controller 1115 may be responsible for data access control for the entire data collection infrastructure 1110. In addition, data access controller 1115 may perform data access control for multiple blockchains for different blockchain consortiums. With this arrangement, the blockchain functions are decoupled from the data collection functions and the blockchain management/messaging does not create overhead bandwidth for the upstream or downstream of the broadband. However, centralized access control can pose scalability/bottleneck issues and may be difficult to implement distributed access control policies.

Figure 12:
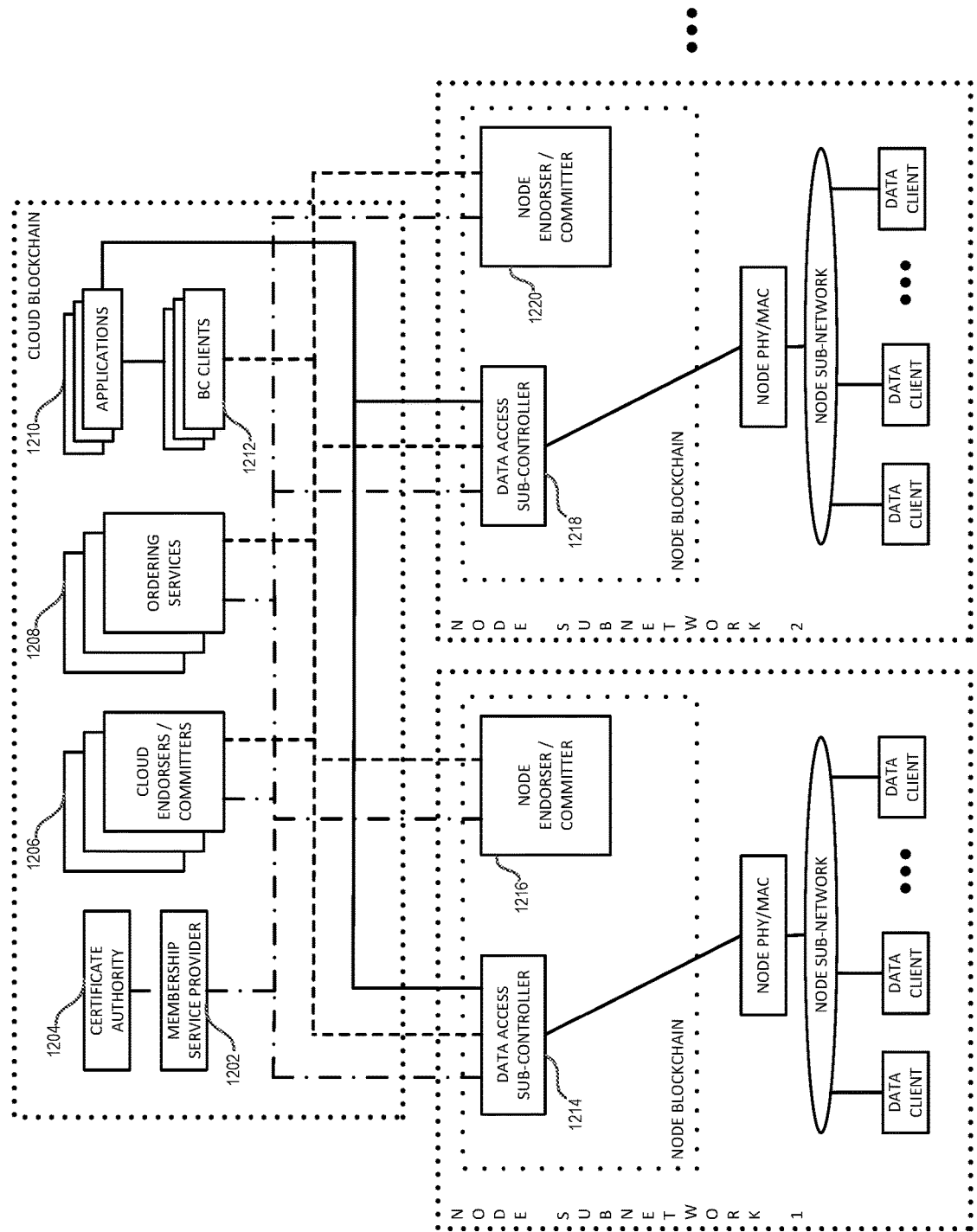
FIG. 12 is a block diagram illustrating components of a blockchain consortium scheme according to aspects of the subject technology.

FIG. 12 is a block diagram illustrating components of a blockchain consortium scheme according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

Similar to the configuration illustrated in FIG. 11, the configuration depicted in FIG. 12 centralizes many of the blockchain components in the cloud. The cloud-based blockchain components may include membership service provider 1202, certificate authority 1204, cloud endorsers/committers 1206, ordering services (order service nodes) 1208, applications 1210, and blockchain clients 1212. Examples of operations of these components are discussed above and will not be repeated here. With respect to data access control, the configuration in FIG. 12 distributes responsibility for data access control across the service network by embedding data access sub-controllers and node endorsers/committers in individual node devices (e.g., CMTS, remote PHY node, OLT, etc.) across the service network. With reference to FIG. 12, data access sub-controller 1214 and node endorser/committer 1216 are embedded in a first node device of node subnetwork 1 and are responsible for data access control for node subnetwork 1, and data access sub-controller 1218 and node endorser/committer 1220 are embedded in a second node device of node subnetwork 2 and are responsible for data access control for node subnetwork 2. The different data access sub-controllers may share the same blockchain or they may be associated with different respective blockchains for different blockchain consortiums. For example, different data access sub-controllers may serve different geographic areas covering the corresponding nodes in those areas.

Embedding the data access sub-controllers and the node endorsers in node devices allows the edge devices of the service network to be involved collectively with the cloud in the distributed blockchain processing. The processing may include hash computation, signature creation/verification, formation of transactions, consensus protocols (e.g., CFT consensus algorithms, Raft, etc.). In this manner, the blockchain processing can utilize node-level compute resources and generally provides for higher blockchain/access control scalability and configurability across a network.

Figure 13:
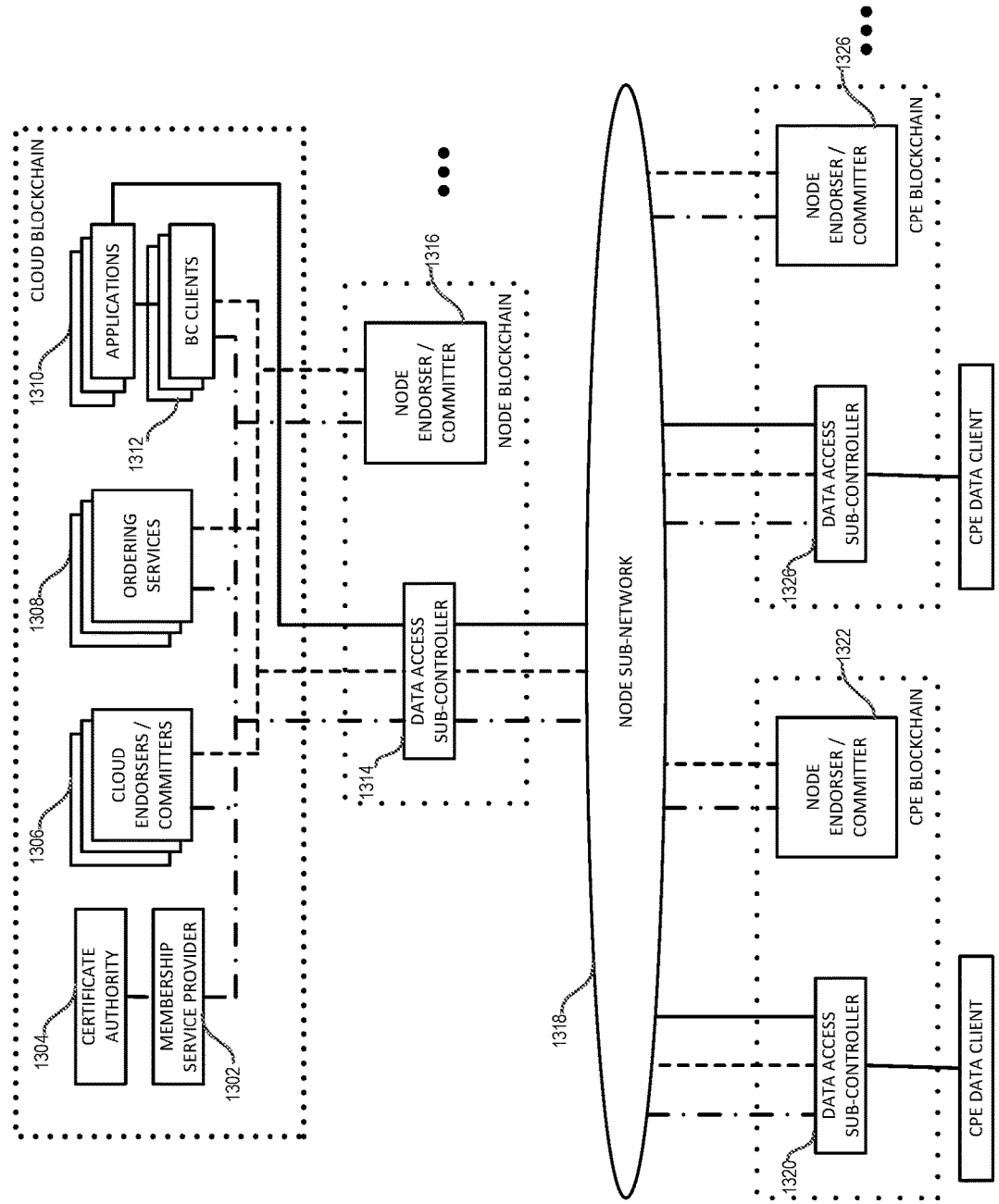
FIG. 13 is a block diagram illustrating components of a blockchain consortium scheme according to aspects of the subject technology.

FIG. 13 is a block diagram illustrating components of a blockchain consortium scheme according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 13, many of the blockchain components may be centralized in the cloud. The cloud-based blockchain components may include membership service provider 1302, certificate authority 1304, cloud endorsers/committers 1306, ordering services 1308, applications 1310, and blockchain clients 1312. Similar to the configuration depicted in FIG. 12, the configuration in FIG. 13 distributes responsibility for data access control across the service network by embedding data access sub-controllers and node endorsers in individual node devices (e.g., CMTS, remote PHY node, OLT, etc.) across the service network. For example, data access sub-controller 1314 and node endorser/committer 1316 may be embedded in an edge node device, such as a CMTS, and may be responsible for data access control for node sub-network 1318.

Within node sub-network 1318, data access sub-controller 1320 and node endorser/committer 1322 may be embedded in a first CPE device and data access sub-controller 1320 and node endorser/committer 1326 may be embedded in a second CPE device. On the CPE level, the blockchain transactions may be associated with local user activities such as polls, surveys, reports, etc. Examples of operations of the various blockchain components depicted in FIG. 13 are provided above and will not be repeated here.

Embedding the data access sub-controllers and the node endorsers in node devices allows the edge devices of the service network and the CPE devices to be involved collectively with the cloud in the distributed blockchain processing. The processing may include hash computation, signature creation/verification, formation of transactions, consensus protocols (e.g., CFT consensus algorithms, Raft, etc.). In this manner, the blockchain processing can utilize node-level compute resources and generally provides for higher blockchain/access control scalability and configurability across a network.

Figure 14:
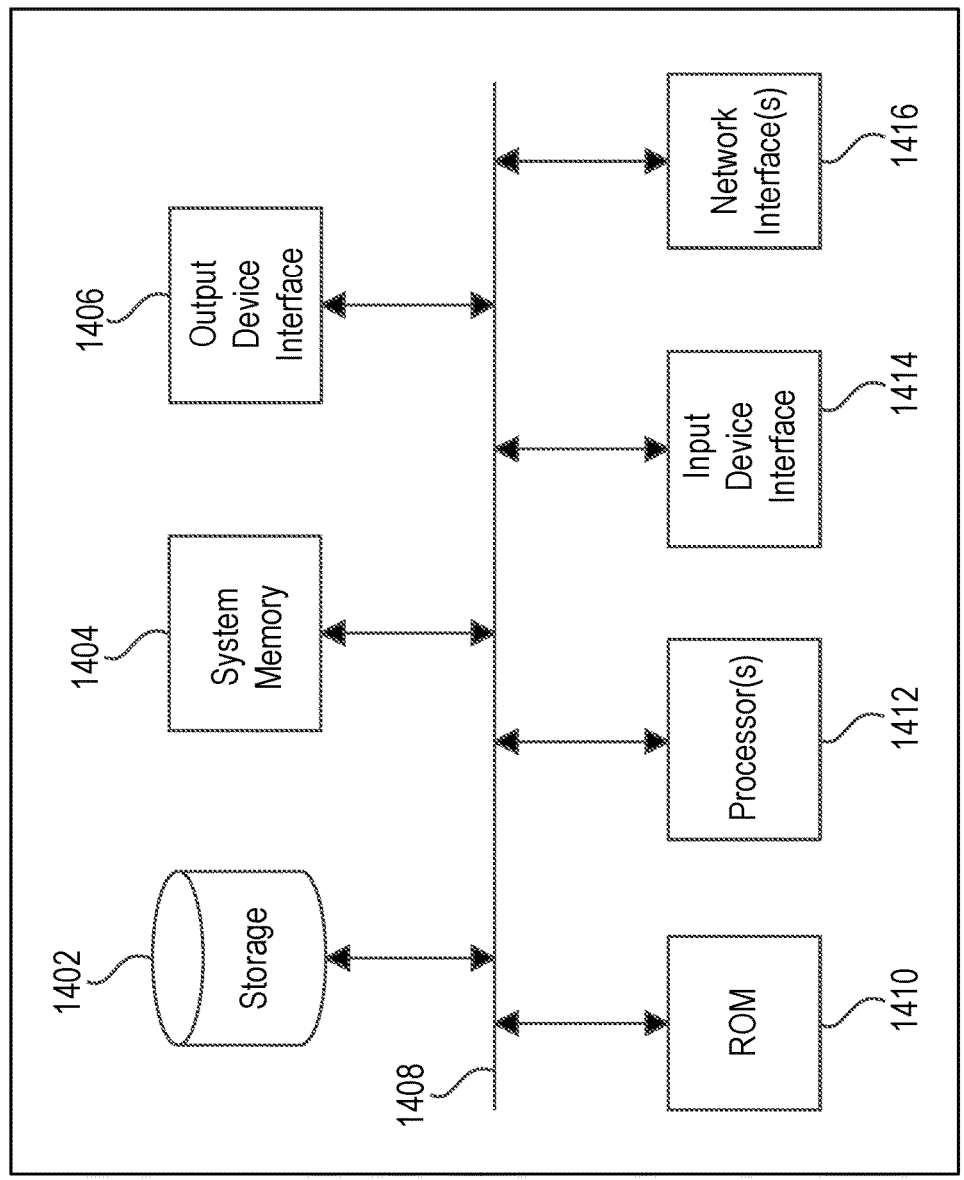
FIG. 14 conceptually illustrates an electronic system with which one or more implementations of the subject technology may be implemented.

FIG. 14 conceptually illustrates an electronic system 1400 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

Electronic system 1400 includes various types of computer readable media and interfaces for various other types of computer readable media. In one or more implementations, the electronic system 1400 may be, or may include, components depicted in FIGS. 1 and/or 4 in addition to the components illustrated in FIG. 14. The electronic system 1400 includes a bus 1408, one or more processing unit(s) 1412, a system memory 1404, a read-only memory (ROM) 1410, a permanent storage device 1402, an input device interface 1414, an output device interface 1406, and a network interface 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multicore processor in different implementations.

The ROM 1410 stores static data and instructions that are needed by the one or more processing unit(s) 1412 and other modules of the electronic system. The permanent storage device 1402, on the other hand, is a read-and-write memory device. The permanent storage device 1402 is a non-volatile memory unit that stores instructions and data even when the electronic system 1400 is off. One or more implementations of the subject disclosure use a mass-storage device (such as a solid-state drive, or a magnetic or optical disk and its corresponding disk drive) as the permanent storage device 1402.

Other implementations use a removable storage device (such as a flash memory drive, optical disk and its corresponding disk drive, external magnetic hard drive, etc.) as the permanent storage device 1402. Like the permanent storage device 1402, the system memory 1404 is a read-and-write memory device. However, unlike the permanent storage device 1402, the system memory 1404 is a volatile read-and-write memory, such as random access memory. System memory 1404 stores any of the instructions and data that the one or more processing unit(s) 1412 needs at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input device interface 1414 and the output device interface 1406. The input device interface 1414 enables a user to communicate information and select commands to the electronic system. Input devices used with the input device interface 1414 include, for example, alphanumeric keyboards and pointing devices (also called "cursor control devices"). The output device interface 1406 enables, for example, the display of images generated by the electronic system 1400. Output devices used with the output device interface 1406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks (not shown) through one or more network interfaces 1416. In this manner, the computer can be a part of one or more network of computers (such as a local area network (LAN), a wide area network (WAN), or an Intranet, or a network of networks, such as the Internet). Any or all components of the electronic system 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

According to aspects of the subject technology, a method is provided that includes receiving a data request from a requesting device requesting data from a data source, looking up, in a blockchain ledger, a transaction corresponding to the data request to validate the data request, forwarding the validated data request to a data server, receiving a data response from the data server in response to the data request, wherein the data response comprises the requested data from the data source, and forwarding the data response to the requesting device.

The data request may include an identifier of the requesting device, an identifier of the data source, an identifier of the requested data, and a time stamp of the data request. The transaction may be looked up in the blockchain ledger based on at least one of the identifier of the requesting device, the identifier of the data source, the identifier of the requested data, or the time stamp of the data request.

The data response may further include a header comprising attributes of the data source and identifiers of one or more destination devices authorized to receive the data identified in the data request, and the requesting device is one of the one or more destination devices. The method of claim 4, wherein the header of the data response further comprises attributes of a protection scheme applied to the requested data in the data response.

The protection scheme may include an encryption algorithm, the requested data in the data response is encrypted using the encryption algorithm and a first encryption key, and the attributes of the protection scheme comprise an identifier of the encryption algorithm and the first encryption key encrypted with a second encryption key associated with the requesting device.

The protection scheme may include a hash algorithm, the attributes of the protection scheme may comprise an identifier of the hash algorithm, and the data response further comprises a hash result from applying the hash algorithm to the requested data. The protection scheme includes a digital signature algorithm, the attributes of the protection scheme comprise an identifier of the digital signature algorithm, and the data response further comprises a digital signature of the data source generated according to the digital signature algorithm. The phrase "digital signature algorithm" may refer to a mathematical technique used to validate the authenticity and integrity of data or digital documents by, for example, the use of public and private keys that are digitally linked. The method may further include receiving a transaction block from an ordering node; and committing the received transaction block to the blockchain ledger. The phrase "ordering node" may refer to an order that provides/delivers an endorsed transaction. The process of committing a received transaction block to a blockchain ledger may include adding a block (representing a transaction) to an existing block once each node (e.g., network participant) validates the transaction. The transaction block may include transactions corresponding to data requests endorsed by one or more endorsing devices according to a data access control policy.

According to aspects of the subject technology, a non-transitory computer-readable medium storing instructions which, when executed by one or more processors, cause the one or more processors to perform operations is provided. The operations include receiving a transaction block from an ordering node, committing the received transaction block to a blockchain ledger, receiving a data request from a requesting device requesting data from a data source, looking up, in the blockchain ledger, a transaction corresponding to the data request to validate the data request, forwarding the validated data request to a data server, receiving a data response from the data server in response to the data request, wherein the data response comprises the requested data from the data source, and forwarding the data response to the requesting device.

The data request may include an identifier of the requesting device, an identifier of the data source, an identifier of the requested data, and a time stamp of the data request, and wherein the transaction may be looked up in the blockchain ledger based on at least one of the identifier of the requesting device, the identifier of the data source, the identifier of the requested data, or the time stamp of the data request. The data response may further comprise a header that includes attributes of the data source, identifiers of one or more destination devices authorized to receive the data identified in the data request, wherein the requesting device is one of the one or more destination devices, and attributes of a protection scheme applied to the requested data in the data response.

The protection scheme may include an encryption algorithm, the requested data in the data response may be encrypted using the encryption algorithm and a first encryption key, and the attributes of the protection scheme comprise an identifier of the encryption algorithm and the first encryption key encrypted with a second encryption key associated with the requesting device. The protection scheme may include a hash algorithm, the attributes of the protection scheme comprise an identifier of the hash algorithm, and the data response further comprises a hash result from applying the hash algorithm to the requested data. The protection scheme may include a digital signature algorithm, the attributes of the protection scheme comprise an identifier of the digital signature algorithm, and the data response further comprises a digital signature of the data source generated according to the digital signature algorithm. The operations may further comprise endorsing a data request, wherein the transaction block comprises the endorsed data request.

According to aspects of the subject technology, a network device is provided that includes a memory storing one or more sequences of instructions and receive a data request from a data server, wherein the data request originated from a requesting device; apply a protection scheme to requested data on the network device identified in the data request; generate a data response comprising the requested data and a header comprising attributes of the network device, identifiers of one or more destination devices authorized to receive the data identified in the data request, wherein the requesting device is one of the one or more destination devices, and attributes of the protection scheme; and provide the data response to the data server in response to the data request.

The protection scheme may include an encryption algorithm, and the processor may be configured to execute the one or more sequences of instructions to encrypt the requested data using the encryption algorithm and a first encryption key, and encrypt the first encryption key with a second encryption key associated with the requesting device. The attributes of the protection scheme comprise an identifier of the encryption algorithm and the first encryption key encrypted with the second encryption.

The protection scheme includes the protection scheme includes a hash algorithm, and wherein the processor is configured to execute the one or more sequences of instructions to: apply the hash algorithm to the requested data to generate a hash result, wherein the attributes of the protection scheme comprise an identifier of the hash algorithm, and the data response further comprises the hash.

The protection scheme may include a digital signature algorithm, where the processor may be configured to execute the one or more sequences of instructions to: generate a digital signature covering the header and the requested data according to the digital signature algorithm, wherein the attributes of the protection scheme comprise an identifier of the digital signature algorithm, and the data response further comprises the digital signature.

The network device may be an edge network device or a consumer-premises equipment device of a service network configured to provide at least one of video, voice, or data services. The attributes of the network device may comprise one or more of an identifier of a vendor associated with the network device, an identifier of a system on a chip embedded in the network device, or a location of the network device within a hierarchical network.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A network device, comprising:
   a memory storing one or more sequences of instructions; and
   a processor configured to execute the one or more sequences of instructions to:
   receive a data request from a requesting device requesting data from a data source;
   look up, in a blockchain ledger, a transaction corresponding to the data request to validate the data request;
   forward the validated data request to a data server;
   receive a data response from the data server in response to the forwarded validated data request, wherein the data response comprises the requested data from the data source and a header comprising attributes of the data source and identifiers of one or more destination devices authorized to receive the data identified in the request; and
forward the requested data to the requesting device.

2. The network device of claim 1, wherein the data request comprises an identifier of the requesting device, an identifier of the data source, an identifier of the requested data, and a time stamp of the data request.

3. The network device of claim 2, wherein the transaction is looked up in the blockchain ledger based on at least one of the identifier of the requesting device, the identifier of the data source, the identifier of the requested data, or the time stamp of the data request.

4. The network device of claim 3,
wherein the requesting device is one of the one or more destination devices.

5. The network device of claim 4, wherein the header of the data response further comprises attributes of a protection scheme applied to the requested data in the data response.

6. The network device of claim 5, wherein:
the protection scheme comprises an encryption algorithm,
the requested data in the data response is encrypted using the encryption algorithm and a first encryption key, and
the attributes of the protection scheme comprise an identifier of the encryption algorithm and the first encryption key encrypted with a second encryption key associated with the requesting device.

7. The network device of claim 5, wherein:
the protection scheme comprises a digital signature algorithm,
the attributes of the protection scheme comprise an identifier of the digital signature algorithm, and
the data response further comprises a digital signature of the data source generated according to the digital signature algorithm.

8. The network device of claim 1, wherein the processor is configured to execute the one or more sequences of instructions to:
receive a transaction block from an ordering node; and
commit the received transaction block to the blockchain ledger.

9. The network device of claim 8, wherein the transaction block comprises transactions corresponding to data requests endorsed by one or more endorsing devices according to a data access control policy.

10. A network device, comprising:
a memory storing one or more sequences of instructions; and
a processor configured to execute the one or more sequences of instructions to:
receive a transaction block from an ordering node;
commit the received transaction block to a blockchain ledger;
receive a data request from an application requesting data from a data source;
lookup, in the blockchain ledger, a transaction corresponding to the data request to validate the data request;
forward the validated data request to a data server;
receive a data response from the data server in response to the data request, wherein the data response comprises the requested data from the data source and a header comprising attributes of the data source and identifiers of one or more destination devices authorized to receive the data identified in the request; and
forward the requested data to the application.

11. The network device of claim 10, wherein:
the data request comprises an identifier of the application, an identifier of the data source, an identifier of the requested data, and a time stamp of the data request, and
the transaction is looked up in the blockchain ledger based on at least one of the identifier of the application, the identifier of the data source, the identifier of the requested data, or the time stamp of the data request.

12. The network device of claim 11, wherein the header of the data response further comprises:
attributes of a protection scheme applied to the requested data in the data response.

13. The network device of claim 12, wherein:
the protection scheme includes an encryption algorithm,
the requested data in the data response is encrypted using the encryption algorithm and a first encryption key, and
the attributes of the protection scheme comprise an identifier of the encryption algorithm and the first encryption key encrypted with a second encryption key associated with the application.

14. The network device of claim 12, wherein:
the protection scheme includes a digital signature algorithm,
the attributes of the protection scheme comprise an identifier of the digital signature algorithm, and
the data response further comprises a digital signature of the data source generated according to the digital signature algorithm.

15. The network device of claim 10, wherein:
the processor is configured to execute the one or more sequences of instructions to endorse a data request, and
the transaction block comprises the endorsed data request.

16. A network device, comprising:
a memory storing one or more sequences of instructions; and
a processor configured to execute the one or more sequences of instructions to:
receive a data request from a data server, wherein the data request originated from a requesting device;
apply a protection scheme to requested data on the network device identified in the data request;
generate a data response comprising the requested data and a header comprising attributes of the network device, identifiers of one or more destination devices authorized to receive the data identified in the data request, wherein the requesting device is one of the one or more destination devices, and attributes of the protection scheme; and
provide the requested data to the data server in response to the data request.

17. The network device of claim 16, wherein the protection scheme includes an encryption algorithm, and wherein the processor is configured to execute the one or more sequences of instructions to:
encrypt the requested data using the encryption algorithm and a first encryption key; and
encrypt the first encryption key with a second encryption key associated with the requesting device,
wherein the attributes of the protection scheme comprise an identifier of the encryption algorithm and the first encryption key encrypted with the second encryption.

18. The network device of claim 16, wherein the network device is an edge network device or a consumer-premises equipment device of a service network configured to provide at least one of video, voice, or data services.

19. The network device of claim 16, wherein the protection scheme includes a digital signature algorithm, and wherein the processor is configured to execute the one or more sequences of instructions to:
   generate a digital signature covering the header and the requested data according to the digital signature algorithm,
   wherein the attributes of the protection scheme comprise an identifier of the digital signature algorithm, and the data response further comprises the digital signature.

20. The network device of claim 16, wherein the attributes of the network device comprise one or more of an identifier of a vendor associated with the network device, an identifier of a system on a chip embedded in the network device, or a location of the network device within a hierarchical network.

* * * * *